(12) United States Patent
Otsuka et al.

(10) Patent No.: US 7,566,762 B2
(45) Date of Patent: Jul. 28, 2009

(54) PROCESS FOR PREPARING FLUOROPOLYMER

(75) Inventors: Masao Otsuka, Settsu (JP); Satoshi Tokuno, Settsu (JP); Katsuya Nakai, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 86 days.

(21) Appl. No.: 10/584,710

(22) PCT Filed: Dec. 22, 2004

(86) PCT No.: PCT/JP2004/019219

§ 371 (c)(1),
(2), (4) Date: Jun. 26, 2006

(87) PCT Pub. No.: WO2005/063827

PCT Pub. Date: Jul. 14, 2005

(65) Prior Publication Data

US 2007/0149733 A1   Jun. 28, 2007

(30) Foreign Application Priority Data

Dec. 25, 2003  (JP)  ............... 2003-430765

(51) Int. Cl.
    C08F 2/00 (2006.01)
(52) U.S. Cl. .................. 526/193; 526/213; 526/216; 526/225; 526/242; 526/255; 524/544; 524/545; 524/546
(58) Field of Classification Search .......... 526/225, 526/242, 89, 94, 72, 243; 524/157, 544
    See application file for complete search history.

(56) References Cited

U.S. PATENT DOCUMENTS

| | | | |
|---|---|---|---|
| 5,179,158 A * | 1/1993 | Azuma et al. ............ 524/748 |
| 6,395,701 B1 * | 5/2002 | Connor et al. ............ 510/437 |
| 6,767,882 B1 * | 7/2004 | Jagannath et al. ............ 510/441 |
| 2003/0068346 A1 * | 4/2003 | Bekele et al. ............ 424/401 |
| 2004/0014873 A1 | 1/2004 | Aga et al. |

FOREIGN PATENT DOCUMENTS

| | | |
|---|---|---|
| JP | 8-41413 A | 2/1996 |
| WO | WO 02/24828 A1 | 3/2002 |
| WO | WO 02/28925 A2 | 4/2002 |

* cited by examiner

*Primary Examiner*—Marc S. Zimmer
*Assistant Examiner*—Nicole M Buie
(74) *Attorney, Agent, or Firm*—Sughrue Mion, PLLC

(57) ABSTRACT

The present invention relates to a process for preparing a fluoropolymer containing at least one kind of fluoroolefin, which comprises carrying out polymerization in the presence of a surfactant represented by the formula (1):

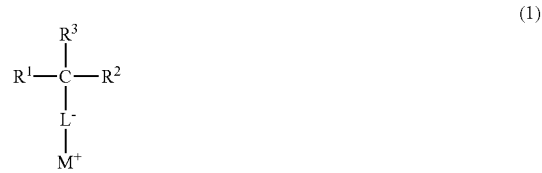

(1)

(wherein $R^1$ and $R^2$ may be the same or different respectively, and represent an alkyl group or an alkenyl group, $R^3$ is a hydrogen atom, an alkyl group or an alkenyl group, the total carbon number of $R^1$ to $R^3$ is 2 to 25, $L^-$ is a group represented by $-SO_3^-$, $-OSO_3^-$, $-PO_3^-$, $-OPO_3^-$ or $-COO^-$, and $M^+$ is a monovalent cation). Thereby, polymerization can be carried out with excellent production efficiency in the presence of a small amount of a surfactant, and a fluoropolymer can be prepared without lowering various physical properties such as water resistance by the surfactant.

5 Claims, 1 Drawing Sheet

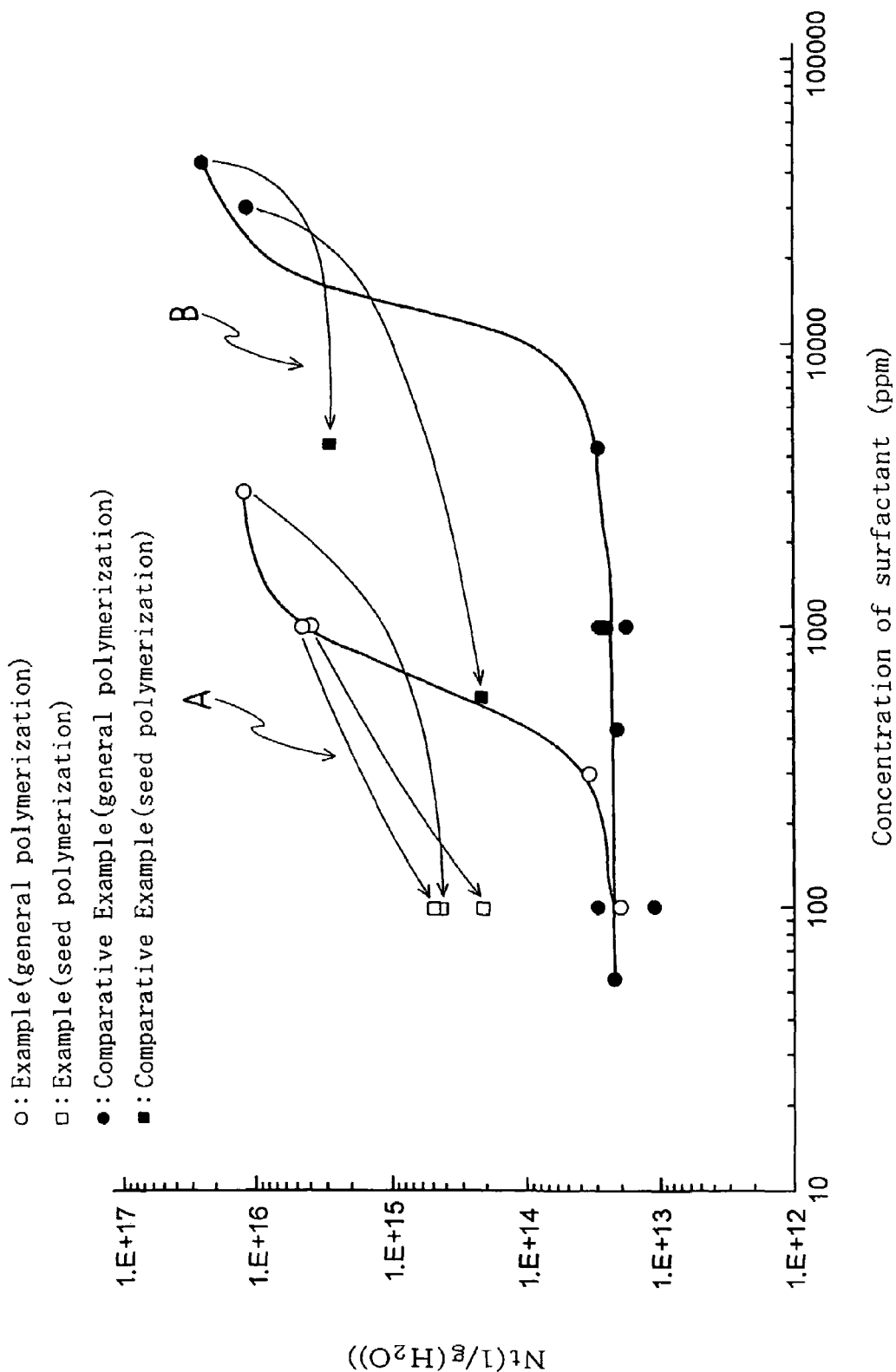

PROCESS FOR PREPARING FLUOROPOLYMER

TECHNICAL FIELD

The present invention relates to a process for preparing a fluoropolymer, in which polymerization can be carried out in the presence of a small amount of a surfactant with excellent production efficiency.

BACKGROUND ART

Fluoropolymers are used in broad industrial fields such as automobile industry, semiconductor industry, and chemical industry as a raw material of such as a sealing material used under severe conditions due to showing excellent chemical resistance, solvent resistance and heat resistance.

Preparation of these fluoropolymers is performed by emulsion polymerizing or suspension polymerizing fluoroolefins. Usually, a surfactant is used in emulsion polymerization, and when an amount of a surfactant in used is larger, the number of polymer particles generated in the initial period of emulsion polymerization increases, its polymerization speed increases, and production efficiency of a fluoropolymer is improved. When a surfactant is used in a large amount, however, there is a tendency that the surfactant lowers various physical properties such as water resistance and the like of the obtained fluoropolymer. Therefore, development of a process for preparing a fluoropolymer, wherein polymerization can be efficiently conducted in the presence of a small amount of a surfactant which does not cause an adverse effect on various physical properties of a fluoropolymer, has been expected so far.

Under such circumstances, a fluoropolymer is prepared by using a straight chain aliphatic sulfonate surfactant for the purpose of substitution of expensive ammonium perfluorooctanoate generally used in emulsion polymerization of a fluoropolymer (for example, see U.S. Pat. No. 6,512,063). This process, however, has a problem of having a small number of generated particles.

DISCLOSURE OF INVENTION

The present invention relates to a process for preparing a fluoropolymer, in which polymerization can be carried out in the presence of a small amount of a surfactant with excellent production efficiency.

Namely, the present invention relates to a process for preparing a fluoropolymer containing at least one kind of fluoroolefin, which comprises carrying out polymerization in the presence of a surfactant represented by the formula (1):

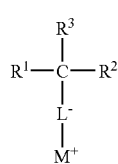

(wherein $R^1$ and $R^2$ may be the same or different respectively, and represent an alkyl group or an alkenyl group, $R^3$ is a hydrogen atom, an alkyl group or an alkenyl group, the total carbon number of $R^1$ to $R^3$ is 2 to 25, $L^-$ is a group represented by $-SO_3^-$, $-OSO_3^-$, $-PO_3^-$, $-OPO_3^-$ or $-COO^-$, and $M^+$ is a monovalent cation).

The surfactant is preferably a surfactant represented by the formula (2):

(wherein $R^1$ and $R^2$ represent an alkyl group or an alkenyl group having a total carbon number of 2 to 25, and may be the same or different respectively. $L^-$ is a group represented by $-SO_3^-$, $-OSO_3^-$, $-PO_3^-$, $-OPO_3^-$ or $-COO^-$, and $M^+$ is a monovalent cation).

The total carbon number is preferably 10 to 20.

The polymerization is preferably polymerization for preparing a seed particle.

The fluoroolefin is preferably 1,1-difluoroethylene.

BRIEF DESCRIPTION OF DRAWING

FIG. 1 shows a relation between the concentration of a surfactant and the number of an dispersing substance by emulsification (the number of particles) per 1 g of water in Examples 1 to 8 and Comparative Examples 1 to 13.

BEST MODE FOR CARRYING OUT THE INVENTION

The present invention relates to a process for preparing a fluoropolymer containing at least one kind of fluoroolefin, which comprises carrying out polymerization in the presence of a surfactant represented by the formula (1):

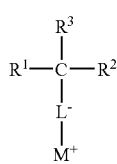

(wherein $R^1$ and $R^2$ may be the same or different respectively, and represent an alkyl group or an alkenyl group, $R^3$ is a hydrogen atom, an alkyl group or an alkenyl group, the total carbon number of $R^1$ to $R^3$ is 2 to 25, $L^-$ is a group represented by $-SO_3^-$, $-OSO_3^-$, $-PO_3^-$, $-OPO_3^-$ or $-COO^-$, and $M^+$ is a monovalent cation).

The fluoroolefin is not particularly limited, however, in the present invention, a copolymer of at least two fluoroolefin monomers, or a copolymer of a fluoroolefin monomer and a non-fluoroolefin monomer can be adopted as a fluoropolymer.

As the fluoroolefin monomer, examples are perfluoroolefin monomers such as tetrafluoroethylene (TFE), hexafluoropropylene (HFP), perfluoro(alkyl vinyl ether) (PAVE), and a compound represented by the following formula:

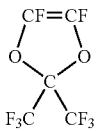

$CF_2$=$CFOCF_2CF$=$CF_2$; and non-perfluoroolefin monomers such as chlorotrifluoroethylene (CTFE), 1,1-difluoroethylene (VdF), trifluoroethylene, vinyl fluoride, trifluoropropylene, pentafluoropropylene, tetrafluoropropylene, and hexafluoroisobutene. Examples of PAVE are perfluoro(methyl vinyl ether) (PMVE), perfluoro(ethyl vinyl ether) (PEVE), and perfluoro(propyl vinyl ether) (PPVE).

Also, functional group-containing fluoroolefin monomers can be used. An example of the functional group-containing fluoroolefin monomer is a compound represented by the following formula (3):

$$CX^1_2\!=\!\overset{X^2}{\underset{}{C}}\!-\!R_f\!-\!Y^1 \qquad (3)$$

(wherein $Y^1$ represents —OH, —COOH, —$SO_2F$, —$SO_3M$ (M is a hydrogen atom, a $NH_4$ group or an alkaline metal), carboxylate, a carboxy ester group, an epoxy group or a cyano group, $X^1$ and $X^2$ are the same or different, and both of them are a hydrogen atom or a fluorine atom, $R_f$ represents a bivalent fluorine-containing alkylene group having 0 to 40 carbon atoms or a bivalent fluorine-containing alkylene group containing an ether bond and having 0 to 40 carbon atoms), and specific examples thereof are:

$CF_2$=$CFOCF_2CF_2CH_2OH$, $CF_2$=$CFO(CF_2)_3COOH$,
$CF_2$=$CFOCF_2CF_2COOCH_3$,

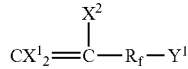

$CF_2$=$CFCF_2COOH$, $CF_2$=$CFCF_2CH_2OH$,

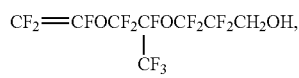

$CF_2$=$CFCF_2OCF_2CF_2CF_2COOH$, $CF_2$=$CFCF_2OCFCOOCH_3$, $CF_2$=$CFOCF_2CFOCF_2CF_2SO_2F$,
         |                              |
         $CF_3$                          $CF_3$ $CF_2$=$CFOCF_2CFOCF_2CF_2COOH$,
         |
         $CF_3$ $CF_2$=$CFOCF_2CF_2SO_2F$, $CF_2$=$CFCF_2CF_2COOH$,
$CF_2$=$CFCF_2COOH$, $CH_2$=$CFCF_2CF_2CH_2CH_2OH$,
$CH_2$=$CFCF_2CF_2COOH$,

$CH_2$=$CF$—$(CF_2CF_2)_2COOH$,

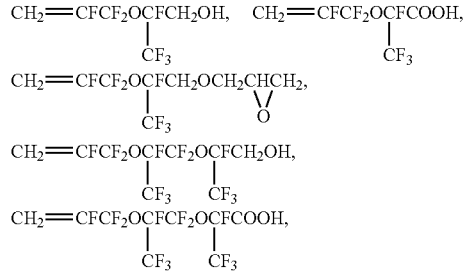

$CH_2$=$CHCF_2CF_2CH_2CH_2COOH$, $CH_2$=$CH$—$(CF_2)_4CH_2CH_2CH_2OH$, $CH_2$=$CH$—$(CF_2)_6CH_2CH_2COOCH_3$,

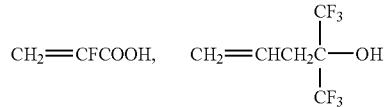

Besides these, iodine-containing monomers, for example, iodides of perfluoro vinyl ethers such as perfluoro(6,6-dihydro-6-iodo-3-oxa-1-hexene), and perfluoro(5-iodo-3-oxa-1-pentene) described in JP-B-5-63482 and JP-A-62-12734 can be copolymerized as a non-perfluoroolefin monomer.

Examples of the non-fluoroolefin monomer are α-olefin monomers having 2 to 10 carbon atoms such as ethylene (ET), propylene, butane, and pentene; alkyl vinyl ethers containing an alkyl group having 1 to 20 carbon atoms such as methyl vinyl ether, ethyl vinyl ether, propyl vinyl ether, cyclohexyl vinyl ether, hydroxybutyl vinyl ether, and butyl vinyl ether. Particularly, a copolymer obtained by polymerization of 1,1-difluoroethylene and hexafluoropropylene or a copolymer obtained by polymerization of 1,1-difluoroethylene, hexafluoropropylene and tetrafluoroethylene is preferable for the purpose of preparing a fluoropolymer.

As for the composition of the obtained fluoropolymer, the molar ratio of 1,1-difluoroethylene:hexafluoropropylene is preferably 100:0 to 50:50, and more preferably 90:10 to 60:40. Tetrafluoroethylene is preferably contained in an amount of 0 to 40% by mol, and more preferably 0 to 30% by mol.

In the present invention, polymerization is carried out in the presence of a surfactant represented by the above formula (1).

$R^1$ and $R^2$ may be the same or different respectively, and represent an alkyl group or an alkenyl group, and $R^3$ is a hydrogen atom, an alkyl group or an alkenyl group. The alkyl group or the alkenyl group may be straight chain or branched.

The total number of carbon atoms in $R^1$ to $R^3$ is 2 to 25, preferably 5 to 20, and more preferably 10 to 20. When the total number of carbon atoms in $R^1$ to $R^3$ is more than 25, there is a tendency that the surfactant is hardly dissolved in water and the concentration thereof in an aqueous phase cannot be increased. A concrete example of such surfactant is Hostapur SAS93 available from Clariant Japan K.K.

Among the above-mentioned combination of $R^1$ to $R^3$, from the viewpoint of intensity of emulsifying force, it is preferable that $R^3$ is a hydrogen atom, $R^1$ and $R^2$ may be the same or different respectively, and are an alkyl group or an alkenyl group having the total carbon number of 2 to 25, it is more preferable that $R^3$ is a hydrogen atom, $R^1$ and $R^2$ may be the same or different respectively, and are an alkyl group or an alkenyl group having the total carbon number of 5 to 20, and it is further preferable that $R^3$ is a hydrogen atom, $R^1$ and $R^2$ may be the same or different respectively, and are an alkyl group or an alkenyl group having the total carbon number of 10 to 20.

Specific examples of the alkyl group or the alkenyl group are a methyl group, ethyl group, propyl group, isopropyl group, butyl group, isobutyl group, t-butyl group, pentyl group, hexyl group, heptyl group, octyl group, nonyl group, decyl group, vinyl group, propenyl group, butenyl group, pentenyl group, hexenyl group, heptanyl group, and octenyl group, which do not contain fluorine.

$L^-$ is a group represented by $-SO_3^-$, $-OSO_3^-$, $-PO_3^-$, $-OPO_3^-$ or $-COO^-$, however, $L^-$ is preferably $-SO_3^-$ from the viewpoint that, even if a surfactant remains in a polymer obtained by coagulating a dispersing substance, the polymer is hardly decomposed during drying or heating.

Examples of the monovalent cation are a lithium ion, sodium ion, potassium ion, rubidium ion, cesium ion and ammonium ion, and a sodium ion and an ammonium ion are preferable from the economical standpoint.

The amount of the surfactant represented by the formula (1) to be used is preferably 100 to 9,000 ppm, and more preferably 500 to 5,000 ppm based on the total amount of water. When the amount of the surfactant to be used is less than 100 ppm, effects as a surfactant become low and the number of generated particles decreases, and when more than 9,000 ppm, coagulation of a dispersing substance caused by a surfactant tends to occur.

The above-described surfactant may be used together with other surfactants.

Examples of the surfactant which can be used together are fluorine-containing surfactants such as $F(CF_2)_7COOM$, $F(CF_2)_8COOM$, $CF_3CF_2CF_2OCF(CF_3)CF_2OCF(CF_3)COOM$, $CF_3CF_2OCF(CF_3)CF_2OCF(CF_3)COOM$, $CF_3OCF(CF_3)CF_2OCF(CF_3)COOM$, $H(CF_2CF_2)_3CH_2OCF(CF_3)COOM$, $H(CF_2)_6COOM$, $H(CF_2)_7COOM$, $H(CF_2)_8COOM$, $C_6F_{13}CH_2CH_2SO_3M$, $F(CF_2CF_2)_2CH_2CH_2SO_3M$, $F(CF_2CF_2)_3CH_2CH_2SO_3M$, $F(CF_2CF_2)_4CH_2CH_2SO_3M$, $F(CF_2CF_2)_2CH_2CH_2SO_4M$, $F(CF_2CF_2)_3CH_2CH_2SO_4M$, and $F(CF_2CF_2)_4CH_2CH_2SO_4M$ (M is a monovalent cation), and hydrocarbon surfactants such as $CH_3(CH_2)_{10}SO_3M$, $CH_3(CH_2)_{11}SO_3M$, $CH_3(CH_2)_{12}SO_3M$, $CH_3(CH_2)_{13}SO_3M$, $CH_3(CH_2)_{14}SO_3M$, $CH_3(CH_2)_{10}SO_4M$, $CH_3(CH_2)_{11}SO_4M$, $CH_3(CH_2)_{12}SO_4M$, $CH_3(CH_2)_{13}SO_4M$, $CH_3(CH_2)_{14}SO_4M$, $CH_3(CH_2)_{10}COOM$, $CH_3(CH_2)_{11}COOM$, $CH_3(CH_2)_{12}COOM$, $CH_3(CH_2)_{13}COOM$, and $CH_3(CH_2)_{14}COOM$ (M is a monovalent cation)

As the surfactant which can be used together, another example is a reactive surfactant comprising a compound having a radical-polymerizable unsaturated bond and a hydrophilic group in the molecule. The reactive surfactant can constitute a portion of a polymer chain of a polymer when allowed to exist in the reaction system during polymerization.

As the reactive surfactant, for example, compounds described in JP-A-8-67795 can be used.

The polymerization process in the present invention is not particularly limited, and known processes such as emulsion polymerization and suspension polymerization may be used. But the process used for initial period of seed polymerization, namely, polymerization for preparing seed particles can be preferably applied from the viewpoint that the number of particles can be increased even if the amount of a surfactant in the obtained polymer is equivalent. A process of seed polymerization is also not particularly limited, and known processes may be used.

As a means for agitating, for example, an anchor blade, a turbine blade, an inclined blade and the like can be used, but agitating by a large scale blade called full-zone or max-blend is preferable from the viewpoint of excellent diffusion of monomers and excellent dispersion stability of a polymer. The agitating apparatus may be a horizontal agitating apparatus or a vertical agitating apparatus.

The polymerization temperature is not particularly limited, and suitable temperature is adopted depending on the kind of a polymerization initiator. However, when the polymerization temperature is too high, the monomer density in a gas phase easily decreases, and a branching reaction of a polymer is caused, and the desired copolymer can not be obtained in some cases. The polymerization temperature is preferably 40 to 120° C., and further preferably 50 to 100° C.

A monomer may be supplied continuously or sequentially.

As the polymerization initiator, oil-soluble peroxides can be used, however, peroxy carbonates such as diisopropyl peroxy dicarbonate (IPP) and di-n-propyl peroxy dicarbonate (NPP), which are typical oil-soluble initiators, have risks such as explosion, besides, expensive, and additionally, have a problem of easily causing adhesion of scales to the wall surface of a polymerization vessel etc during a polymerization reaction. In order to lower permanent compression strain of a fluoropolymer, it is preferable to use a water-soluble radical polymerization initiator. As the water-soluble radical polymerization initiator, examples are preferably ammonium salts, potassium salts and sodium salts of persulfuric acid, perboric acid, perchloric acid, perphosphoric acid and percarbonic acid, and particularly, ammonium persulfate and potassium persulfate are preferable.

The addition amount of the polymerization initiator is not particularly restricted, and at least an amount within a degree not remarkably lowering a polymerization speed (for example, a few ppm based on water) is added at once in the initiation period of polymerization, or sequentially or continuously. The upper limit thereof is within a degree where polymerization reaction heat can be removed from a surface of an apparatus.

In the preparation process of the present invention, a molecular weight adjuster and the like may be further added. The molecular weight adjuster may be added at once in the initiation period, or added continuously or dividedly.

Examples of the molecular weight adjuster are esters such as dimethyl malonate, diethyl malonate, methyl acetate, ethyl acetate, butyl acetate, and dimethyl succinate, and additionally, isopentane, isopropanol, acetone, various mercaptans, carbon tetrachloride, cyclohexane, monoiodomethane, 1-iodomethane, 1-iodopropane, isopropyl iodide, diiodomethane, 1,2-diiodomethane, and 1,3-diiodopropane.

Additionally, a buffer and the like may be appropriately added, but its amount is preferably in a range not damaging the effect of the present invention.

EXAMPLES

Next, the present invention is explained based on Examples, but is not limited thereto.

<Analysis Device>

Mooney viscosity (1+100, 100° C.) was measured by using MOON MV2000E (made by ALPHA TECHNOLOGIES), the particle size of a dispersing substance by emulsification was measured by using Microtrac UPA (made by NIKKISO CO., LTD.), and the molecular weight of a fluoropolymer was measured by using GPC (made by TOSOH CORPORATION).

Example 1

A stainless autoclave having a 0.1 L capacity was charged with 50 g of ion exchange water, 0.05 g of ammonium persulfate (APS), and 0.005 g of Hostapur SAS93 (secondary alkanesulfonate Na salt, $((CH_3(CH_2)_m)(CH_3(CH_2)_n)CHSO_3Na$, m+n=14 to 17, available from Clariant Japan K.K.) as a surfactant, and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa. This autoclave was immersed in a water bath equipped with a horizontal mobile agitator, which was previously set at 80° C., and a polymerization reaction was initiated. After three minutes, the pressure in the autoclave became constant and, then, lowered with progress of the polymerization reaction. The polymerization reaction was carried out for 1 hour.

After terminating the polymerization reaction, the autoclave was taken out of the water bath, remaining monomers were released into atmosphere, and the particle size of the obtained dispersing substance by emulsification was measured by UPA to find a value of 95.2 nm. By evaporating and drying a part of the dispersing substance by emulsification to solidify, the concentration of the dispersing substance by emulsification was measured to find a value of 1.63%. From the particle size and the concentration of the dispersing substance by emulsification, the number of the dispersing substance by emulsification (the number of particles) per 1 g of water was calculated to find a value of $2 \times 10^{13}$.

Example 2

A stainless autoclave having a 0.1 L capacity was charged with 50 g of ion exchange water, 0.05 g of ammonium persulfate (APS), and 0.015 g of Hostapur SAS93 (secondary alkanesulfonate Na salt, $((CH_3(CH_2)_m)(CH_3(CH_2)_n)CHSO_3Na$, m+n=14 to 17, available from Clariant Japan K.K.), and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant and, then, lowered with progress of the polymerization reaction. The polymerization reaction was carried out for 1.67 hours.

After terminating the polymerization reaction, the autoclave was taken out of the water bath, remaining monomers were released into atmosphere, and the particle size of the obtained dispersing substance by emulsification was measured by UPA to find a value of 60.8 nm. By evaporating and drying a part of the dispersing substance by emulsification to solidify, the concentration of the dispersing substance by emulsification was measured to find a value of 0.71%. From the particle size and the concentration of the dispersing substance by emulsification, the number of the dispersing substance by emulsification (the number of particles) per 1 g of water was calculated to find a value of $3.4 \times 10^{13}$.

Example 3

A stainless autoclave having a 0.1 L capacity was charged with 50 g of ion exchange water, 0.05 g of ammonium persulfate (APS), and 0.05 g of Hostapur SAS93 (secondary alkanesulfonate Na salt, $((CH_3(CH_2)_m)(CH_3(CH_2)_n)CHSO_3Na$, m+n=14 to 17 available from Clariant Japan K.K.), and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to give a pressure of 1 MPa. This autoclave was immersed in a water bath equipped with a horizontal mobile agitator which was previously controlled at a temperature of 80° C., and a polymerization reaction was initiated. After three minutes, the pressure in the autoclave became constant and, then, lowered with progress of the polymerization reaction. The polymerization reaction was carried out for 1 hour.

After terminating the polymerization reaction, the autoclave was taken out of the water bath, remaining monomers were released into atmosphere, and by evaporating and drying a part of the dispersing substance by emulsification to solidify, the concentration of the dispersing substance by emulsification was measured to find a value of 0.15%.

Example 4

A stainless autoclave having a 0.1 L capacity was charged with 50 g of ion exchange water, 0.05 g of ammonium persulfate (APS), and 0.15 g of Hostapur SAS93 (secondary alkanesulfonate Na salt, $((CH_3(CH_2)_m)(CH_3(CH_2)_n)CHSO_3Na$, m+n=14 to 17, available from Clariant Japan K.K.), and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant and, then, lowered with progress of the polymerization reaction. The polymerization reaction was carried out for 1.67 hours.

After terminating the polymerization reaction, the autoclave was taken out of the water bath, remaining monomers were released into atmosphere, and by evaporating and drying a part of the dispersing substance by emulsification to solidify, the concentration of the dispersing substance by emulsification was measured to find a value of 0.19%.

Example 5

Since the particle size of the dispersing substance by emulsification obtained in Example 3 could not be measured by UPA, 5 g of the dispersing substance by emulsification was diluted with 45 g of ion exchange water to adjust the surfactant concentration of 100 ppm same as that in Example 1, thereto was added 0.05 g of ammonium persulfate, and the polymerization operation in the same manner as Example 1 was carried out for 1 hour as seed polymerization. The concentration of the newly obtained dispersing substance by emulsification was 1.28% and the particle size was 31.3 nm, from which the number of particles was calculated to be $4.5 \times 10^{14}$. The number of particles of the dispersing substance by emulsification before dilution was calculated to be $4.5 \times 10^{15}$.

Example 6

Since the particle size of the dispersing substance by emulsification obtained in Example 4 could not be measured by UPA, 1 g of the dispersing substance by emulsification was diluted with 29 g of ion exchange water to adjust the surfactant concentration of 100 ppm same as that in Example 1, thereto was added 0.05 g of ammonium persulfate, and the polymerization operation in the same manner as Example 1 was carried out for 1 hour as seed polymerization. The concentration of the newly obtained dispersing substance by emulsification was 1.3 % and the particle size was 33 nm, from which the number of particles was calculated to be $3.9 \times 10^{14}$. The number of particles of the dispersing substance by emulsification before dilution was calculated to be $1.2 \times 10^{16}$.

Example 7

A stainless autoclave having a 1.8 L capacity was charged with 1,010 g of ion exchange water and 1.02 g of Hostapur SAS93 (secondary alkanesulfonate Na salt, $((CH_3(CH_2)_m)(CH_3(CH_2)_n)CHSO_3Na$, m+n=14 to 17, available form Clariant Japan K.K.), and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa, and the internal temperature of the autoclave was increased up to 80° C. while agitating by an electromagnetic stirrer, and the autoclave was left until the pressure became constant. Subsequently, an aqueous solution prepared by dissolving 1.01 g of ammonium persulfate in 5.00 g of ion exchange water was pressed in with a nitrogen gas and a polymerization reaction was initiated. Then, the pressure lowered with progress of the polymerization reaction. The polymerization reaction was carried out for 3.5 hours.

After terminating the polymerization reaction, remaining monomers were released into atmosphere, and by evaporating and drying a part of the dispersing substance by emulsification to solidify, the concentration of the dispersing substance by emulsification was measured to find a value of 0.24%.

Example 8

A stainless autoclave having a 1.8 L capacity was charged with 942 g of ion exchange water and 52.08 g of a dispersing substance which by emulsification treated with heat at a temperature of 80° C. under atmosphere for 12 hours in order to decompose ammonium persulfate remaining in the dispersing substance by emulsification obtained in Example 7. And the autoclave was purged sufficiently with nitrogen and form a vacuum, thereafter, 220 g of a mixed gas comprising 438 g of hexafluoropropylene (HFP) and 132 g of 1,1-difluoroethylene (VdF) was charged under the vacuum condition, and the internal temperature of the autoclave was raised to 80° C. while agitating by an electromagnetic stirrer, and the autoclave was left until the pressure became constant. Then, an aqueous solution prepared by dissolving 3.78 g of diethyl malonate and 0.15 g of ammonium persulfate in 4.94 g of water was pressed in with nitrogen and a polymerization reaction was initiated. Since the pressure was lowed with progress of the polymerization reaction, the pressure decrease was compensated by adding a mixed gas comprising 22% by mol of hexafluoropropylene (HFP) and 78% by mol of 1,1-difluoroethylene (VdF) by a plunger pump. 266 g of the mixed gas comprising 22% by mol of hexafluoropropylene (HFP) and 78% by mol of 1,1-difluoroethylene (VdF) was charged in the polymerization vessel, to terminate the polymerization.

After terminating the polymerization reaction, remaining monomers were released into atmosphere, and the particle size of the obtained dispersing substance by emulsification was measured by UPA to find a value of 123.5 nm. By evaporating and drying a part of the dispersing substance by emulsification to solidify, the concentration of the dispersing substance by emulsification was measured to find a value of 26.55%. ML (1+10, 100° C.) was 82.6. The weight average molecular weight was 214,000 and the number average molecular weight was 92,100 in polystyrene standard by GPC. From the particle size and the concentration of the dispersing substance by emulsification, the number of the dispersing substance by emulsification (the number of particles) per 1 g of water was calculated to find a value of $2 \times 10^{14}$. The number of particles of the dispersing substance by emulsification in Example 7 was calculated to find a value of $3.8 \times 10^{15}$. The Mooney viscosity of the obtained dispersing substance by emulsification was 82.6. As a result of $^{19}$F-NMR analysis, the monomer unit composition of the obtained polymer was VdF/HFP=78.2/21.8% by mol.

Comparative Example 1

A stainless autoclave having a 0.1 L capacity was charged with 50 g of ion exchange water, 0.05 g of ammonium persulfate (APS), and 0.0028 g of APFO (ammonium perfluorooctanoate) as a surfactant, and the autoclave was purged sufficiently with nitrogen and form a vacuum, thereafter, a mixed gas comprising 60% by mol of hexafluoropropylene (HFP) and 40% by mol of 1,1-difluoroethylene (VdF) was charged under the vacuum condition so as to have a pressure of 1 MPa. This autoclave was immersed in a water bath equipped with a horizontal mobile agitator which was previously set at 80° C., and a polymerization reaction was initiated. After three minutes, the pressure in the autoclave became constant and, then, lowered with progress of the polymerization reaction. The polymerization reaction was carried out for 0.5 hour.

After terminating the polymerization reaction, the autoclave was taken out of the water bath, remaining monomers were released into atmosphere, and the particle size of the obtained dispersing substance by emulsification was measured by UPA to find a value of 70.8 nm. By evaporating and drying a part of the dispersing substance by emulsification to solidify, the concentration of the dispersing substance by emulsification was measured to find a value of 0.72%. From the particle size and the concentration of the dispersing substance by emulsification, the number of the dispersing substance by emulsification (the number of particles) per 1 g of water was calculated to find a value of $2.2\times10^{13}$.

Comparative Example 2

A stainless autoclave having a 0.1 L capacity was charged with 50 g of ion exchange water, 0.05 g of ammonium persulfate (APS), and 0.0216 g of APFO (ammonium perfluorooctanoate) as a surfactant, and the autoclave was purged sufficiently with nitrogen and form a vacuum, thereafter, a mixed gas comprising 60% by mol of hexafluoropropylene (HFP) and 40% by mol of 1,1-difluoroethylene (VdF) was charged under the vacuum condition so as to have a pressure of 1 MPa. This autoclave was immersed in a water bath equipped with a horizontal mobile agitator which was previously set at 80° C., and a polymerization reaction was initiated. After three minutes, the pressure in the autoclave became constant, and then, the pressure was lowered with progress of the polymerization reaction. The polymerization reaction was carried out for 0.5 hour.

After terminating the polymerization reaction, the autoclave was taken out of the water bath, remaining monomers were released into atmosphere, and the particle size of the obtained dispersing substance by emulsification was measured by UPA to find a value of 71.1 nm. By evaporating and drying a part of the dispersing substance by emulsification to solidify, the concentration of the dispersing substance by emulsification was measured to find a value of 0.7%. From the particle size and the concentration of the dispersing substance by emulsification, the number of the dispersing substance by emulsification (the number of particles) per 1 g of water was calculated to find a value of $2.1\times10^{13}$.

Comparative Example 3

A stainless autoclave having a 0.1 L capacity was charged with 50 g of ion exchange water, 0.05 g of ammonium persulfate (APS), and 0.215 g of APFO (ammonium perfluorooctanoate) as a surfactant, and the autoclave was purged sufficiently with nitrogen and form a vacuum, thereafter, a mixed gas comprising 60% by mol of hexafluoropropylene (HFP) and 40% by mol of 1,1-difluoroethylene (VdF) was charged under vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 0.5 hours.

After terminating the polymerization reaction, the autoclave was taken out of the water bath, remaining monomers were released into atmosphere, and the particle size of the obtained dispersing substance by emulsification was measured by UPA to find a value of 67.4 nm. By evaporating and drying a part of the dispersing substance by emulsification to solidify, the concentration of the dispersing substance by emulsification was measured to find a value of 0.82%. From the particle size and the concentration of the dispersing substance by emulsification, the number of the dispersing substance by emulsification (the number of particles) per 1 g of water was calculated to find a value of $2.9\times10^{13}$.

Comparative Example 4

A stainless autoclave having a 0.1 L capacity was charged with 50 g of ion exchange water, 0.05 g of ammonium persulfate (APS), and 2.15 g of APFO (ammonium perfluorooctanoate) as a surfactant, and the autoclave was purged sufficiently with nitrogen and form a vacuum, thereafter, a mixed gas comprising 60% by mol of hexafluoropropylene (HFP) and 40% by mol of 1,1-difluoroethylene (VdF) was charged under the vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant, and then the pressure was lowered with progress of the polymerization reaction. The polymerization reaction was carried out for 0.5 hour.

After terminating the polymerization reaction, the autoclave was taken out of the water bath, remaining monomers were released into atmosphere, and by evaporating and drying a part of the dispersing substance by emulsification to solidify, the concentration of the dispersing substance by emulsification was measured to find a value of 3.57%.

Comparative Example 5

Since the particle size of the dispersing substance by emulsification obtained in Comparative Example 4 could not be measured by UPA, 5 g of the dispersing substance by emulsification was diluted with 45 g of ion exchange water to have a surfactant concentration same as that in Comparative Example 3, thereto was added 0.05 g of ammonium persulfate, and the polymerization operation in the same manner as Comparative Example 3 was carried out for 0.5 hour as seed polymerization. The concentration of the newly obtained dispersing substance by emulsification was 8.32% and the particle size was 33.9 nm from which the number of particles was calculated to be $2.5\times10^{15}$. The number of particles of the dispersing substance by emulsification before dilution was calculated to be $2.5\times10^{16}$.

Comparative Example 6

A stainless autoclave having a 1.8 L capacity was charged with 1,000 g of ion exchange water and 30 g of APFO (ammonium perfluorooctanoate), and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 2 MPa, and the internal temperature of the autoclave raised to 80° C. while agitating by an electromagnetic stirrer, and the autoclave was left until the pressure became constant. Subsequently, an aqueous solution prepared by dissolving 0.6 g of ammonium persulfate in 5.00 g of ion exchange water was pressed in with a nitrogen gas and a polymerization reaction was initiated. Then, the pressure was lowered with progress of the polymerization reaction. The polymerization reaction was carried out for 0.5 hour.

After terminating the polymerization reaction, remaining monomers were released into atmosphere, and by evaporating and drying a part of the dispersing substance by emulsification to solidify, the concentration of the dispersing substance by emulsification was measured to find a value of 18%.

Comparative Example 7

A stainless autoclave having a 1.8 L capacity was charged with 968 g of ion exchange water and 22.2 g of a dispersing substance by emulsification which treated with heat at a temperature of 80° C. under atmosphere for 12 hours in order to decompose ammonium persulfate remaining in the dispersing substance by emulsification obtained in Example 6. And the autoclave was purged sufficiently with nitrogen and form a vacuum, thereafter, 220 g of a mixed gas comprising 438 g of hexafluoropropylene (HFP) and 132 g of 1,1-difluoroethylene (VdF) was charged under the vacuum condition, and the internal temperature of the autoclave was raised to 80° C. while agitating by an electromagnetic stirrer, and the autoclave was left until the pressure became constant. Then, an aqueous solution prepared by dissolving 3.78 g of diethyl malonate and 0.15 g of ammonium persulfate in 5.0 g of water was pressed in with nitrogen, and a polymerization reaction was initiated. Since the pressure decreased with progress of the polymerization reaction, the pressure decrease was compensated by adding a mixed gas comprising 22% by mol of hexafluoropropylene (HFP) and 78% by mol of 1,1-difluoroethylene (VdF) by a plunger pump. 266 g of the mixed gas comprising 22% by mol of hexafluoropropylene (HFP) and 78% by mol of 1,1-difluoroethylene (VdF) was charged in the polymerization vessel to terminate the polymerization.

After terminating the polymerization reaction, remaining monomers were released into atmosphere, and the particle size of the obtained dispersing substance by emulsification was measured by UPA to find a value of 118 nm. By evaporating and drying a part of the dispersing substance by emulsification to solidify, the concentration of the dispersing substance by emulsification was measured to find a value of 27%. ML (1+10, 100° C.) was 82.6. The weight average molecular weight was 205,000 and the number average molecular weight was 98,000 in polystyrene standard by GPC. From the particle size and the concentration of the dispersing substance by emulsification, the number of the dispersing substance by emulsification (the number of particles) per 1 g of water was calculated to find a value of $2 \times 10^{14}$. The number of particles of the dispersing substance by emulsification in Comparative Example 6 was calculated to find a value of $1.1 \times 10^{16}$. As a result of $^{19}$F-NMR analysis, the monomer unit composition of the obtained polymer was VdF/HFP=78.3/21.7% by mol.

Comparative Example 8

A stainless autoclave having a 0.1 L capacity was charged with 50 g of ion exchange water, 0.05 g of ammonium persulfate (APS), and 0.005 g of sodium n-octanesulfonate as a surfactant, and the autoclave was purged sufficiently with nitrogen and form a vacuum, thereafter, a mixed gas comprising 22% by mol of hexafluoropropylene (HFP) and 78% by mol of 1,1-difluoroethylene (VdF) was charged under the vacuum condition so as to have a pressure of 2.4 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 1 hour.

After terminating the polymerization reaction, the autoclave was taken out of the water bath, remaining monomers were released into atmosphere, and the particle size of the obtained dispersing substance by emulsification was measured by UPA to find a value of 105.9 nm. By evaporating and drying a part of the dispersing substance by emulsification to solidify, the concentration of the dispersing substance by emulsification was measured to find a value of 3.11%. From the particle size and the concentration of the dispersing substance by emulsification, the number of the dispersing substance by emulsification (the number of particles) per 1 g of water was calculated to find a value of $2.9 \times 10^{13}$.

Comparative Example 9

A stainless autoclave having a 0.1 L capacity was charged with 50 g of ion exchange water, 0.05 g of ammonium persulfate (APS), and 0.05 g of sodium n-octanesulfonate as a surfactant, and the autoclave was purged sufficiently with nitrogen and form a vacuum, thereafter, a mixed gas comprising 22% by mol of hexafluoropropylene (HFP) and 78% by mol of 1,1-difluoroethylene (VdF) was charged under the vacuum condition so as to have a pressure of 2.4 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 1 hour.

After terminating the polymerization reaction, the autoclave was taken out of the water bath, remaining monomers were released into atmosphere, and the particle size of the obtained dispersing substance by emulsification was measured by UPA to find a value of 105.9 nm. By evaporating and drying a part of the dispersing substance by emulsification to solidify, the concentration of the dispersing substance by emulsification was measured to find a value of 3.11%. From the particle size and the concentration of the dispersing substance by emulsification, the number of the dispersing substance by emulsification (the number of particles) per 1 g of water was calculated to find a value of $2.9 \times 10^{13}$.

Comparative Example 10

A stainless autoclave having a 0.1 L capacity was charged with 50 g of ion exchange water, 0.05 g of ammonium persulfate (APS), and 0.05 g of sodium laurylsulfate as a surfactant, and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 1.8 hours.

After terminating the polymerization reaction, the autoclave was taken out of the water bath, remaining monomers were released into atmosphere, and the particle size of the obtained dispersing substance by emulsification was measured by UPA to find a value of 70.5 nm. By evaporating and drying a part of the dispersing substance by emulsification to solidify, the concentration of the dispersing substance by emulsification was measured to find a value of 0.89%. From the particle size and the concentration of the dispersing substance by emulsification, the number of the dispersing substance by emulsification (the number of particles) per 1 g of water was calculated to find a value of $2.7 \times 10^{13}$.

Comparative Example 11

A stainless autoclave having a 0.1 L capacity was charged with 50 g of ion exchange water, 0.05 g of ammonium persulfate (APS), and 0.05 g of sodium n-decanesulfate as a surfactant, and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 1.5 hours.

After terminating the polymerization reaction, the autoclave was taken out of the water bath, remaining monomers were released into atmosphere, and the particle size of the obtained dispersing substance by emulsification was measured by UPA to find a value of 84.5 nm. By evaporating and drying a part of the dispersing substance by emulsification to solidify, the concentration of the dispersing substance by emulsification was measured to find a value of 1.0%. From the particle size and the concentration of the dispersing substance by emulsification, the number of the dispersing substance by emulsification (the number of particles) per 1 g of water was calculated to find a value of $1.8 \times 10^{13}$.

Comparative Example 12

A stainless autoclave having a 0.1 L capacity was charged with 50 g of ion exchange water, 0.05 g of ammonium persulfate (APS), and 0.005 g of sodium n-decanesulfate as a surfactant, and the autoclave was purged sufficiently with nitrogen and form a vacuum, thereafter, a mixed gas comprising 65% by mol of hexafluoropropylene (HFP) and 35% by mol of 1,1-difluoroethylene (VdF) was charged under the vacuum condition so as to have a pressure of 1MPa. This autoclave was immersed in a water bath equipped with a horizontal mobile agitator which was previously set at a temperature of at 80° C., and a polymerization reaction was initiated. After three minutes, the pressure in the autoclave became constant, and then, the pressure was lowered with progress of the polymerization reaction. The polymerization reaction was carried out for 1.5 hours.

After terminating the polymerization reaction, the autoclave was taken out of the water bath, remaining monomers were released into atmosphere, and the particle size of the obtained dispersing substance by emulsification was measured by UPA to find a value of 134.8 nm. By evaporating and drying a part of the dispersing substance by emulsification to solidify, the concentration of the dispersing substance by emulsification was measured to find a value of 2.5%. From the particle size and the concentration of the dispersing substance by emulsification, the number of the dispersing substance by emulsification (the number of particles) per 1 g of water was calculated to find a value of $1.1 \times 10^{13}$.

Comparative Example 13

A stainless autoclave having a convent volume of 0.1 L was charged 50 g of ion exchange water, 0.05 g of ammonium persulfate (APS), and 0.05 g of sodium n-undecanoate as a surfactant, and the autoclave was purged sufficiently with nitrogen and form a vacuum, then, a mixed gas comprising 22% by mol of hexafluoropropylene (HFP) and 78% by mol of 1,1-difluoroethylene (VdF) was charged under the vacuum condition so as to have a pressure of 2.4 MPa. This autoclave was immersed in a water bath equipped with a horizontal mobile agitator which was previously set at a temperature of 80° C., and a polymerization reaction was initiated. After three minutes, the pressure in the autoclave became constant, and then, the pressure was lowered with progress of the polymerization reaction. The polymerization reaction was carried out for 1 hour.

After terminating the polymerization reaction, the autoclave was taken out of the water bath, remaining monomers were released into atmosphere, and the particle size of the obtained dispersing substance by emulsification was measured by UPA to find a value of 60 nm. By evaporating and drying a part of the dispersing substance by emulsification to solidify, the concentration of the dispersing substance by emulsification was measured to find a value of 0.5%. From the particle size and the concentration of the dispersing substance by emulsification, the number of the dispersing substance by emulsification (particle number) per 1 g of water was calculated to find a value of $2.5 \times 10^{13}$.

A relation between the concentration of the surfactant and the number of the dispersing substance by emulsification (the number of particles) per 1 g of water in Examples 1 to 8 and Comparative Examples 1 to 13 is shown in FIG. 1. In FIG. 1, blank circles show a relation between the surfactant concentration and the number of particles of the emulsion polymers in Examples 1 to 4 and 7 which were not subjected to seed polymerization, blank squares show a relation between the surfactant concentration and the number of particles of the emulsion polymers in Examples 5, 6 and 8 which were subjected to seed polymerization. In FIG. 1, solid circles show a relation between the surfactant concentration and the number of particles of the emulsion polymers in Comparative Examples 1 to 4, 6 and 8 to 13 which were not subjected to seed polymerization, and solid squares show a relation between the surfactant concentration and the numbers of particle of the emulsion polymers in Comparative Examples 5, 7 which were subjected to seed polymerization. Arrow A shows change of a relation between the surfactant concentration and the number of particles of the polymers in the case of seed polymerization in Examples 5, 6 and 8 using the dispersing substance by emulsifications obtained in Examples 3, 4 and 7. On the other hand, Arrow B shows change of a relation between the surfactant concentration and the number of particles of the polymers in the case of seed polymerization in Comparative Examples 5, 7 using the dispersing substance by emulsifications obtained in Comparative Examples 4, 6.

As is known from FIG. 1, the number of particles can be significantly increased by only adding a small amount of surfactant by conducting polymerization in the presence of a surfactant represented by the formula (1).

In Examples 1, 5 and 6, the concentration of a surfactant was 100 ppm, and in Examples 5 and 6, the number of particles was at least $1.0 \times 10^{14}$, on the other hand, in Example 1 in which general polymerization was carried out, the number of particles was $2 \times 10^{13}$, which shows that the number of particles significantly increases by carrying out seed polymerization even if the surfactant concentration is equivalent.

INDUSTRIAL APPLICABILITY

According to the present invention, polymerization can be conducted with excellent production efficiency in the presence of a small amount of a surfactant, and a fluoropolymer can be prepared without lowering various physical properties such as water resistance by a surfactant.

The invention claimed is:

1. A process for preparing a fluoropolymer containing at least one kind of fluoroolefin, which comprises carrying out polymerization in the presence of a surfactant represented by the formula (1):

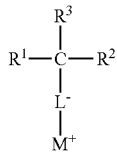

wherein $R^1$ and $R^2$ may be the same or different respectively and represent an alkyl group or an alkenyl group, $R^3$ is a hydrogen atom, an alkyl group or an alkenyl group, the total carbon number of $R^1$ to $R^3$ is 2 to 25, $L^-$ is a group represented by $-SO_3^-$, $-OSO_3^-$, $-PO_3^-$, $-OPO_3^-$ or $-COO^-$, and $M^+$ is a monovalent cation.

2. The process for preparing a fluoropolymer of claim 1, wherein the surfactant is a surfactant represented by the formula (2):

wherein $R^1$ and $R^2$ represent an alkyl group or an alkenyl group having a total carbon number of 2 to 25, and may be the same or different respectively, $L^-$ is a group represented by $-SO_3^-$, $-OSO_3^-$, $-PO_3^-$, $-OPO_3^-$ or $-COO^-$, and $M^+$ is a monovalent cation.

3. The process for preparing a fluoropolymer of claim 1, wherein the total carbon number is 10 to 20.

4. The process for preparing a fluoropolymer of claim 1, wherein the polymerization is polymerization for preparing a seed particle.

5. The process for preparing a fluoropolymer of claim 1, wherein the fluoroolefin is 1,1-difluoroethylene.

* * * * *